United States Patent

[11] 3,580,661

| [72] | Inventor | Dexter P. Cooper, Jr.<br>Pasadena, Calif. |
|---|---|---|
| [21] | Appl. No. | 815,092 |
| [22] | Filed | Apr. 10, 1969 |
| [45] | Patented | May 25, 1971 |
| [73] | Assignee | Bell & Howell Company<br>Chicago, Ill. |

[54] REAR PROJECTION VIEWING SCREEN FOR CLOSE VIEWING
18 Claims, 9 Drawing Figs.

[52] U.S. Cl. .................................................. 350/128
[51] Int. Cl. ............................................... G03b 21/60
[50] Field of Search .......................................... 350/128, 127, 117

[56] References Cited
UNITED STATES PATENTS

| 2,131,974 | 10/1938 | De L. Saint Genies | 350/128 |
| 2,351,034 | 6/1944 | Gabor | 350/128X |
| 2,531,399 | 11/1950 | Cawein et al. | 350/127X |
| 2,596,049 | 5/1952 | Siezen | 350/127 |

FOREIGN PATENTS

| 666,222 | 2/1952 | Great Britain | 350/128 |

Primary Examiner—S. Clement Swisher
Assistant Examiner—Joseph W. Roskos
Attorney—David Weiss ABSTRACT: A nonreflective, directional diffusing, rear projection plastic viewing screen for close audience viewing. The screen comprises a composite Fresnel lens structure which includes suitably crossed convex cylindrical Fresnel lens patterns, and a superposed lenticular sheet structure for focusing incremental images—from horizontally overconverged light—at acentrically positioned light-transmitting areas on an opaque, plane viewing surface.

PATENTED MAY 25 1971　　3,580,661
SHEET 1 OF 2
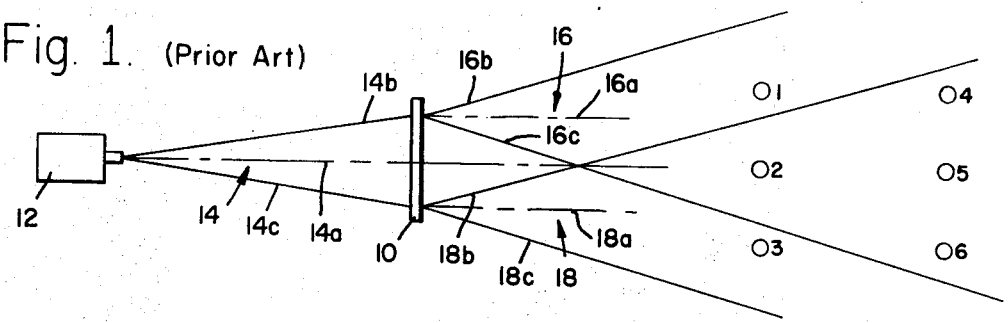
Fig. 1. (Prior Art)
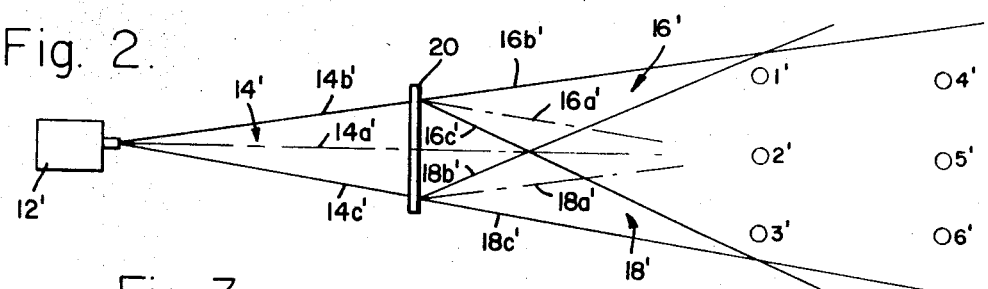
Fig. 2.
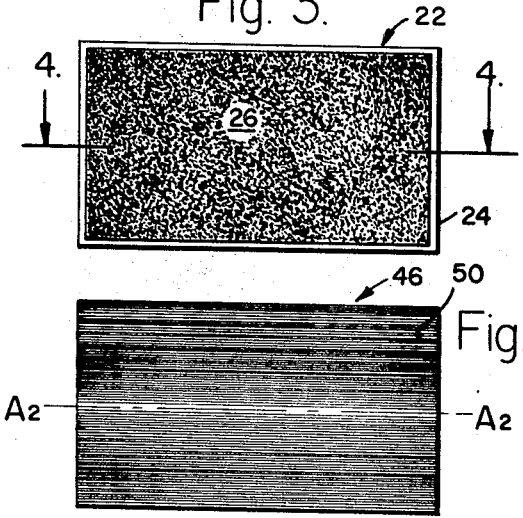
Fig. 3.
Fig. 5.
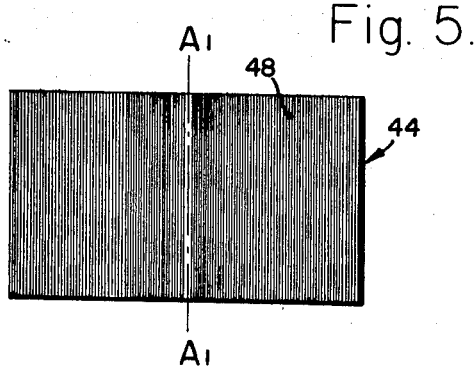
Fig. 6.
Fig. 7.
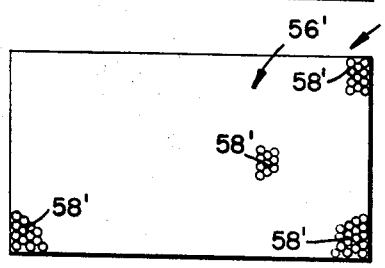
Fig. 8.
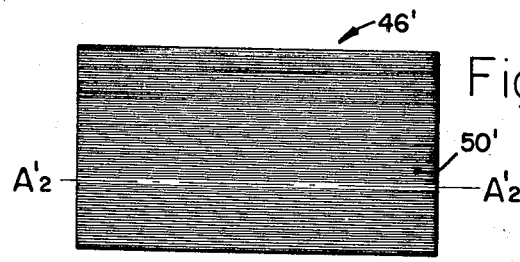
Fig. 9.
Dexter P. Cooper, Jr.,
INVENTOR.
BY.
David Weis
ATTORNEY.

Dexter P. Cooper, Jr.,
INVENTOR.
BY.

ATTORNEY.

REAR PROJECTION VIEWING SCREEN FOR CLOSE VIEWING

FIELD OF THE INVENTION

This invention relates to rear projection viewing screens, and more particularly to wide screens permitting close viewing.

BACKGROUND OF THE INVENTION

The screen of the present invention has general application wherever rear projection imaging is utilized, but has particular application for close viewing of widescreen imaging. When viewing projection systems for displaying television, and still and motion pictures it is desirable to situate the spectators sufficiently close to the viewing screen for providing audience comfort and for utilizing available space in an economic manner. In addition to the realization of this object, the present invention permits the production of very large rear projection viewing screens capable for close viewing of large area images as well as multiple images from a plurality of projectors. Such large screens may be advantageously utilized, for example, to create simulated visual environments in student training situations.

Directional diffusing viewing screens (i.e., screens where the light associated with incremental areas of a projected image is diffused over restricted angles, thereby increasing the apparent brightness of the image), as well as nonreflective or "black" screens, are well known to the prior art. Usually, however, the optical axes of the "beams" associated with the respective incremental images are directed to be normal to such screens, so that overlapping of all incremental beams originating from all of the areas on the screen, occurs at a substantial distance from the screen.

A method of adapting a rear projection viewing screen for close viewing, utilized in the screens of the present invention, is to cause the axes of the incremental beams to be diffracted toward the normal to the center of the screen, at least in the horizontal direction, decreasing the distance from the screen where all elements of the entire image can be viewed.

SUMMARY OF THE INVENTION

The directional diffusing screen of the present invention comprises, in combination, a series of superposed sheet members of light-transmitting plastic material. In a preferred embodiment of the present screen, one of the sheet members is a convex spherical Fresnel lens (i.e., a Fresnel lens which optically approximates a conventional planoconvex spherical lens). In its preferred configuration, the spherical Fresnel lens comprises two convex cylindrical Fresnel lenses (i.e., Fresnel lenses which are optically analogous to conventional planoconvex cylindrical lenses), both having the same focal length and fixedly arranged in crossed relation (i.e., superposed such that the two sets of parallel grooves or zones of the cylindrical Fresnel patterns are perpendicular to one another).

A second of the sheet members is an additional convex cylindrical Fresnel lens arranged in superposed contacting relation to the spherical Fresnel lens, and the cylindrical Fresnel pattern is situated such that the parallel grooves or zones thereof are in a generally vertical position with respect to the audience.

The third sheet member has a lenticulated face and a plane face, the lenticulated face comprising a plurality of convex lenticular elements facing the Fresnel lens structure in spaced relation thereto. In the preferred screen embodiment, the convex lenticular elements are cylindrical in shape and are arranged parallel to the grooves of the cylindrical Fresnel pattern of the second sheet member, although spherically lenticular elements can alternatively be utilized.

The plane face of the third sheet member includes masking means thereon, having light-transmitting areas associated with the lenticular elements and positioned to intercept focused light rays when the screen is appropriately positioned with respect to a projector.

BRIEF DESCRIPTION OF THE DRAWINGS

The novel structure of the nonreflective rear projection viewing screen of the present invention, together with further advantages and an explanation of the optical characteristics thereof, will be better understood from the following description considered in connection with accompanying drawings in which a preferred embodiment of the invention and certain modifications of the preferred embodiment illustrated by way of example. It is to be expressly understood, however, that the drawings are for the purpose of illustration and description only, and are not intended as a definition of the limits of the invention.

FIG. 1 is a diagrammatic top view of a typical rear projection viewing system of the prior art;

FIG. 2 is a diagrammatic top view of a rear projection viewing system utilizing the screen of the present invention;

FIG. 3 is a front view of a preferred embodiment of a rear projection viewing screen of the present invention;

FIGS. 5, 6 and 7 are face views of the optically effective patterns of the plastic sheet members shown in FIG. 4;

FIG. 8 is a face view of a spherically lenticulated sheet member as used in a modification of the preferred embodiment of the screen in accordance with the present invention;

FIG. 9 is a face view of an acentric cylindrical Fresnel lens pattern as used in another modification of the preferred embodiment of the screen in accordance with the present invention.

DETAILED DESCRIPTION OF THE INVENTION

Figure 4:
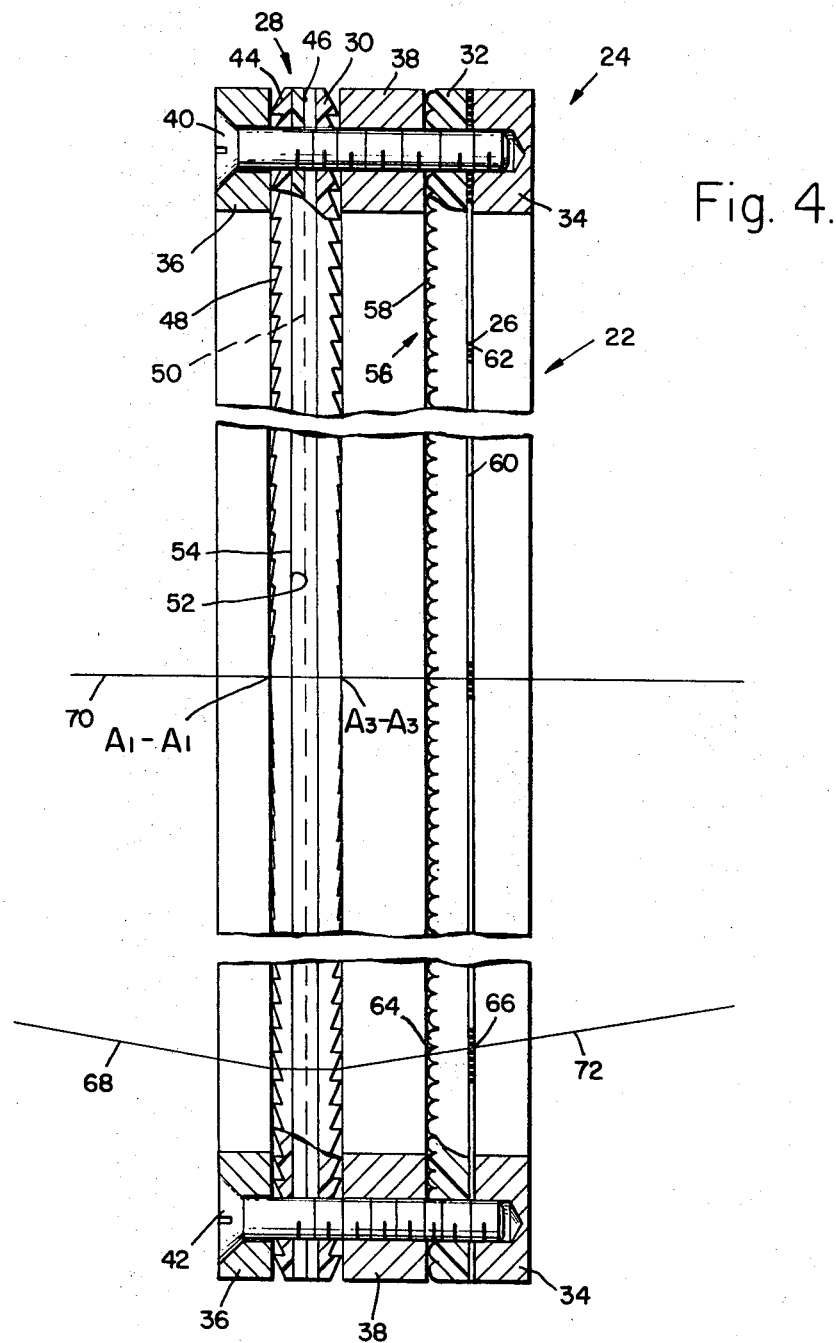
FIG. 4 is a sectional view of the screen of FIG. 3, taken along the line 4—4 in the direction of the appended arrows.

Turning first to FIG. 1, a typical rear projection viewing screen 10 of the prior art is shown in combination with an image projector 12, and is interposed in the optical pattern of the image beam 14 projected by the projector 12 and having an optical axis 14a and outermost rays 14b, 14c. The image produced at the screen 10 is divided into incremental portions, each incremental image producing an associated beam (such as outermost emergent beams 16, 18 having respective optical axes, 16a, 18a) diffused over restricted angles as defined by emergent rays 16b, 16c associated with the incremental beams 16, and emergent rays 18b, 18c associated with the incremental beam 18.

The incremental beams 16, 18 emerge from the screen 10 with their respective optical axes 16a, 18a, generally perpendicular to the screen 10, so that overlapping of beams commences at a distance from the screen determined essentially by the beam spread or diffusion angle of the beams 16, 18 and proceeds in accordance with that diffusion angle (such as defined by emergent rays 16c, 18b). Since an observer can see the complete image only when he is positioned at a location where all incremental beams overlap, an audience which includes two rows of observers $0_1$, $0_2$, $0_3$, $0_4$, $0_5$, $0_6$, positioned as shown, will include observers $0_1$, $0_3$ who do not see all portions of the complete image produced at the screen 10. In situations where an audience cannot be repositioned (e.g., in commercial passenger aircraft), the first row of the audience associated with a particular screen 10 must be positioned no closer than observers $0_4$, $0_5$, $0_6$.

Turning next to FIG. 2, wherein primed reference numerals are used to indicate elements corresponding to those of FIG. 1, the first audience row (which includes observers $0'_1$, $0'_2$, $0'_3$) can be positioned closer to a screen 20 made in accordance with the present invention, than would be possible with the screen 10 of FIG. 1. The screen 20 of the present invention causes the optical axes $16a'$, $18a'$ of the emergent incremental beams $16'$, $18'$ to be horizontally deflected toward the center of the screen. Overlapping of the emergent beam $16'$, $18'$ proceeds in accordance with the diffusion angle of the emergent beams and the deflection angle of the optical axes associated therewith. Accordingly, overlapping commences closer to the screen 20, and proceeds in accordance with a larger overlapping angle (defined by the intersection of the emergent rays 16c', 18b') than is possible with the typical screen 10 of the prior art showing FIG. 1.

As shown in FIG. 3, the preferred embodiment of a screen 22 of the present invention is of the wide screen type (i.e., the dimensions of the screen 22 are greater in its horizontal direction than in its vertical direction), and includes a frame 24 securing the various optical components in predetermined arrangement. The viewing surface of the screen 22 includes masking screens 26 thereon having a plurality of light-transmitting portions in a predetermined configuration, as hereinafter discussed, and provides a generally black appearance to the screen.

Turning next to FIG. 4, the screen 22 of the preferred embodiment is shown in fragmented cross section. It must be realized that the structure of the optical components shown in FIG. 4 are somewhat exaggerated in order to provide clarity of description.

In general requirements, the screen 22 of the preferred embodiment includes three superposed light-transmitting (preferably transparent) plastic sheet members arranged in predetermined relation with respect to one another, and more particularly described as a convex spherical Fresnel lens 28, a convex cylindrical Fresnel lens 30, and a lenticulated sheet member 32. The spherical Fresnel lens 28 and cylindrical Fresnel lens 30 are secured in contacting relation with one another, while the lenticulated sheet member 32 is secured in spaced relation with respect to the composite Fresnel structure 28, 30, by means of cooperating front and rear frame members 34, 36, spacer member 38, and fastening means such as screws 40, 42.

Although the spherical Fresnel lens 28 can be of a conventional type (i.e. having annular grooves or zones which are concentric or in the form of continuous spiral), it is preferred that the spherical Fresnel lens 28 be a combination structure of two cylindrical Fresnel lenses having the same focal length and arranged in crossed relation.

More particularly, the preferred spherical Fresnel lens 28 comprises a first convex cylindrical Fresnel lens 44 and a second convex cylindrical lens 46 (both having the same focal length), the first and second lenses 44, 46 being fixedly arranged in crossed relation to one another. For example, when the screen 22 is installed for viewing, the closely spaced parallel grooves 48 of the first cylindrical Fresnel lens 44 extend in a generally vertical direction (see FIG. 5) while the parallel grooves 50 of the second cylindrical Fresnel lens 46 extend in a horizontal direction (see FIG. 6). It is noted that the cylindrical Fresnel lens patterns each include a longitudinal axis (i.e., a first longitudinal axis $A_1$–$A_1$ as shown in FIG. 5, and a second longitudinal axis $A_1$–$A_2$ as shown in FIG. 6) along their respective optical centers, which in the preferred case is coincident with the physical center lines of the two lenses 44, 46. When the Fresnel lenses 44, 46 are crossed, their respective Fresnel patterns are superposed and their longitudinal axes $A_1$–$A_{1a'}$ $A_2$–$A_2$ are perpendicular to one another. The Fresnel lenses 44, 46 are fixed to one another throughout their unpatterned or smooth faces 52, 54, such as by conventional solvent welding techniques.

The second sheet member 30 is another or third convex cylindrical Fresnel lens having a vertically arranged longitudinal axis $A_3$–$A_3$, and is similar in appearance to the first cylindrical Fresnel lens 44 shown in FIG. 5. The third cylindrical Fresnel lens 30 is arranged in superposed contacting relation to the spherical Fresnel lens 28.

It should be realized that the second sheet member 30 can be omitted if the focal length of the vertically positioned cylindrical Fresnel lens 44 is shorter than the focal length of the horizontally positioned cylindrical Fresnel lens 46. The focal length of the horizontal lens 46 is selected to cause the emergent rays to be substantially parallel to one another in the vertical direction, while the shorter focal length lens overconverges the rays in the horizontal direction.

Two vertically positioned cylindrical Fresnel lenses (in addition to the horizontally positioned lens) are preferred, however, to avoid situations where sufficient refracting power is not possible with a single cylindrical Fresnel lens for providing acceptable horizontal overconvergence. Furthermore, substantial economies in screen fabrication are possible if all three lenses 30, 44, 46 are of the same focal length, since a single mold can be utilized in their fabrication.

The lenticulated sheet member 32 includes a lenticulated face 56 comprising a plurality of convex lenticular elements 58 which, in the preferred screen embodiment 22, are vertically arranged cylindrically lenticular elements 58 (see FIG. 7). Alternatively, the elements 58 can be rotationally displaced slightly from vertical, for significantly decreasing moire interference.

The lenticulated face 56 is positioned obverse to the Fresnel lens structure 28, 30, and at a sufficient distance therefrom to provide a slight amount of spatial incoherence for avoiding the occurrence of observable moire patterns.

It has been experienced that the occurrence of observable moire patterns can be further decreased by providing a slight rotational displacement (in opposite directions) of the two generally vertical cylindrical Fresnel lenses 30, 44. For example, if the longitudinal axis $A_1$–$A_1$ (FIG. 5) is slightly rotated in a clockwise direction, then the longitudinal axis $A_3$–$A_3$ of the third lens 30 is rotated by an equal amount in a counterclockwise direction. The optical effect of such equal but opposite rotation is equivalent to the case in which both generally vertical axes are exactly parallel, but moire interference is significantly reduced.

The lenticulated sheet member 32 further includes a plane face 60 having masking means 26 thereon which has light-transmitting areas 62 therein corresponding to and coextensive with the cylindrical lenticular elements 58. However, as the distances of the light-transmitting areas 62 increase from the screen's vertical centerline, the light-transmitting areas 62 are progressively positioned toward the center of the screen with respect to their respective lenticular elements 58, better illustrated by the relative positions of a particular lenticular element 64 and its associated light-transmitting area 66.

The screen 22 is installed such that the composite Fresnel lens structure 28, 30 intercepts the optical path of the diverging light rays (including a typical diverging ray 68) emerging from a projector. The crossed cylindrical Fresnel lens 34, 36 converges the divergent rays 68 to be substantially parallel to the system optical axis 70. The third cylindrical Fresnel lens 30, being vertically positioned, overconverges the light rays 68 in the horizontal direction.

The lenticular elements 58 focus elemental portions of the image in the vicinity of the lenticulated members's plane face 60. The optical axis 72 of an incremental beam emerging from the particular light-transmitting area 66 is horizontally deflected toward the optical axis 70 (as discussed with respect to FIG. 2). It should be noted that the light-transmitting areas 62 must be positioned with respect to its corresponding lenticular element 58 such that the areas 62 intercept the focused light rays emanating from the screen 22.

Although it is preferred that the lenticular elements be cylindrical, other lenticular shapes can also be utilized. In FIG. 8, for example, a lenticulated sheet member 32' has a lenticulated face 56' comprised of spherically lenticular elements 58'. In such a case, the masking means on the sheet member's plane face (not shown) will include "pin hole" light-transmitting areas corresponding to the respective spherically lenticular elements 58', acentrically positioned with respect to their associated element 58' in the same manner as shown in FIG. 4.

In a further modification of the screen 22 in accordance with the present invention, the spherical Fresnel lens 28 is constructed such that the second cylindrical Fresnel lens 46 is acentric. For example, the acentric cylindrical Fresnel lens 46' shown in FIG. 9 can be substituted therefor. Since the longitudinal axis $A_2$–$A_2$ is situated below the lens physical center, emergent light rays will be deflected in a generally downward direction, and this modification is useful in overhead screens which cannot be appropriately inclined from a vertical position.

It should be noted that when an acentric Fresnel lens is used in a screen having spherically lenticular elements, the light-transmitting pin holes in the masking means must be slightly repositioned downward, to assure that they intercept the focused light rays emanating from the screen. No such adjustment is required when vertically directed cylindrical lenticular elements are used, since the light transmitting areas in the masking unit are coextensive the with the corresponding lenticular elements.

Thus, there has been shown a preferred embodiment of a nonreflecting, directional diffusing rear projection screen for close viewing, and two modifications thereof. Other embodiments of the invention, and other modifications of the embodiment herein presented, may be developed without departing from the essential characteristics thereof.

Accordingly the invention is to be shown by the scope of the claims listed below.

What I claim is:

1. A rear projection viewing screen, comprising the combination of:
    a composite Fresnel lens structure including a plastic convex spherical Fresnel lens and a plastic convex cylindrical Fresnel lens arranged in superposed contacting relation;
    a light-transmitting plastic sheet member having a lenticulated face and a plane face, said lenticulated face comprising a plurality of convex lenticular elements and arranged in superposed spaced relation to said composite Fresnel lens structure; and
    means securing said lenses and said sheet member in said relations.

2. The rear projection viewing screen according to claim 1, wherein said spherical Fresnel lens comprises:
    A second plastic convex cylindrical Fresnel lens;
    a third plastic convex cylindrical Fresnel lens of the same focal length as said second cylindrical Fresnel lens, said second and third cylindrical Fresnel lenses fixedly arranged in crossed relation.

3. The rear projection viewing screen according to claim 1, wherein the three of said cylindrical Fresnel lenses are of the same focal length.

4. The rear projection viewing screen according to claim 1, wherein said spherical Fresnel lens comprises:
    a second light-transmitting plastic sheet member having first and second faces,
    said first face describing a convex cylindrical Fresnel lens pattern,
    said second face describing a convex cylindrical Fresnel lens pattern having the same focal length as the Fresnel lens pattern of said first face,
    said cylindrical Fresnel lens patterns of said first and second faces being in crossed relation.

5. The rear projection viewing screen according to claim 1, wherein said cylindrical Fresnel lens includes a longitudinal axis, and said lenticulated face comprises a plurality of convex cylindrically lenticular elements arranged substantially parallel to said longitudinal axis.

6. The rear projection viewing screen according to claim 1, wherein said cylindrical Fresnel lens includes a longitudinal axis, said lenticulated face comprises a plurality of convex cylindrically lenticular elements arranged substantially parallel to said longitudinal axis, and said sheet member further includes masking means on said plane face, said masking means having light-transmitting areas therein corresponding to and coextensive with said cylindrically lenticular elements and positioned to intercept focused light rays emanating from the screen.

7. The rear projection viewing screen according to claim 1, wherein said lenticulated face comprises a plurality of convex spherically lenticular elements.

8. The rear projection viewing screen according to claim 1, wherein said lenticular face comprises a plurality of convex spherically lenticular elements, and said sheet member further includes masking means on said plane face, said masking means having light-transmitting areas therein corresponding to said spherically lenticular elements and positioned to intercept focused light rays emanating from the screen.

9. A rear projection viewing screen, comprising the combination of:
    a first light-transmitting plastic sheet member having first and second faces, said first face describing a cylindrical Fresnel lens pattern having a first longitudinal axis and said second face describing a cylindrical Fresnel lens pattern having a second longitudinal axis substantially perpendicular to said first longitudinal axis, said Fresnel lens patterns having the same focal length;
    a second light-transmitting plastic sheet member having a face describing a convex cylindrical Fresnel lens pattern including a third longitudinal axis, said second sheet member arranged in superimposed contacting relation to said first sheet member;
    a third light-transmitting plastic sheet member having a lenticulated face and a plane face, said lenticulated face comprising a plurality of convex lenticular elements arranged in superposed spaced relation to said second sheet member, said third sheet member including masking means on said plane face, said masking means having light-transmitting areas therein corresponding to said lenticular elements and positioned to intercept focused light rays emanating from the screen; and,
    means securing said sheet members in said relations.

10. The rear projection viewing screen according to claim 9, wherein all of said cylindrical Fresnel lens patterns are of the same focal length.

11. The rear projections viewing screen according to claim 9, wherein said lenticulated face comprises a plurality of convex cylindrically lenticular element substantially arranged parallel to said third longitudinal axis.

12. The rear projection viewing screen according to claim 9, wherein said lenticulated face comprises a plurality of convex spherically lenticular elements.

13. The rear projection viewing screen according to claim 9, wherein said second longitudinal axis is perpendicular to said third longitudinal axis.

14. The rear projection viewing screen according to claim 9, wherein said second longitudinal axis is perpendicular to said third longitudinal axis, and said second longitudinal axis is acentric on said second sheet member.

15. A rear projection viewing screen, comprising the combination of:
    a composite Fresnel lens structure including a first plastic convex cylindrical Fresnel lens and a second plastic convex cylindrical Fresnel lens arranged in crossed relation;
    a light-transmitting plastic sheet member having a lenticulated face and a plane face, said lenticulated face comprising a plurality of convex lenticular elements and arranged in superposed spaced relation to said composite Fresnel lens structure; and
    means securing said lenses and said sheet member in said relations.

16. The rear projection viewing screen according to claim 15, wherein said first and second cylindrical Fresnel lenses have respectively different focal lengths.

17. The rear projection viewing screen according to claim 15, wherein said first and second cylindrical Fresnel lenses have the same focal length, said composite Fresnel lens structure further including a third plastic convex cylindrical Fresnel lens arranged in superposed contacting relation with said second cylindrical Fresnel lens.

18. In a rear projection viewing screen, a composite Fresnel lens structure comprising the combination of:
    three plastic convex cylindrical Fresnel lenses in superposed successively contacting relation and having respective longitudinal axes,
    the longitudinal axes of two of said lenses being substantially perpendicular to the longitudinal axis of the third of said lenses but rotationally displaced therefrom by equal amounts and in opposite directions.